| United States Patent [19] | [11] Patent Number: 4,630,065 |
|---|---|
| Ichikawa | [45] Date of Patent: Dec. 16, 1986 |

[54] CURRENT LOCATION INDICATION APPARATUS FOR USE IN AN AUTOMOTIVE VEHICLE

[75] Inventor: Akira Ichikawa, Saitama, Japan

[73] Assignee: Honda Giken Kogyo Kabushiki Kaisha, Tokyo, Japan

[21] Appl. No.: 492,358

[22] Filed: May 6, 1983

[30] Foreign Application Priority Data

May 17, 1982 [JP] Japan .................................. 57-82730
May 17, 1982 [JP] Japan .................................. 57-82731

[51] Int. Cl.⁴ .............................................. G08G 1/12
[52] U.S. Cl. ................................... 340/995; 340/988; 364/445; 364/460
[58] Field of Search ............... 340/988, 989, 990, 995; 364/424, 443, 444, 445, 446, 447, 448, 449, 460, 521; 358/102, 103; 353/12

[56] References Cited

U.S. PATENT DOCUMENTS

| 4,138,726 | 2/1979 | Girault | 340/995 |
|---|---|---|---|
| 4,139,889 | 2/1979 | Ingels | 340/989 |
| 4,400,727 | 8/1983 | Aron | 340/995 |
| 4,400,780 | 8/1983 | Nagao | 340/995 |
| 4,499,491 | 2/1985 | Aron | 340/995 |
| 4,513,377 | 4/1985 | Hasebe | 340/995 |
| 4,550,317 | 10/1985 | Moriyama | 340/988 |

Primary Examiner—John W. Caldwell, Sr.
Assistant Examiner—Michael F. Heim
Attorney, Agent, or Firm—Irving M. Weiner; Joseph P. Carrier; Pamela S. Burt

[57] ABSTRACT

A current location indicating apparatus for use in an automotive vehicle wherein a current location of the automotive vehicle in terms of two-dimensional coordinates may be obtained arithmetically by a signal processing unit on the basis of a signal to detect a current travel distance of the vehicle and a signal to detect a current direction of travel taken by the vehicle, so that the current location of the vehicle may be indicated visually on a display screen on the basis of the thus-obtained locational data which varies from time to time. The apparatus comprises a microfilm including a plurality of fractioned area maps with a part of the areas thereof overlapped with each other, an access unit adapted to access each of the plurality of area maps, and an image pick-up unit adapted to photographically pick-up the images of the area maps accessed. A desired area map is presented on the display screen in accordance with the graphic information of each of the area maps as read-out by the image pick-up unit, and when the current locational point of the vehicle comes near the edge of the area of display of an area map currently on the display as the vehicle proceeds in its travel, another related area map with a part thereof overlapped with the previous one is switched to on the display under the control of the signal processing unit.

2 Claims, 19 Drawing Figures

CURRENT LOCATION INDICATION APPARATUS FOR USE IN AN AUTOMOTIVE VEHICLE

BACKGROUND OF THE INVENTION

1. Field of the Invention

The present invention relates generally to an apparatus for providing a visual indication of a current location of a mobile craft. More particularly, the invention relates to an improved apparatus having a visual indication function of a current location of an automotive vehicle or the like, for providing a visual display of combined information on a current travel status of the vehicle, such as in terms of a current location, a path of travel, a travel direction, etc., for the driver or operator.

2. Description of Relevant Art

In order to prevent the driver or operator of an automative vehicle or the like from becoming lost when driving at night or in unfamiliar surroundings away from his desired route of travel, there have been proposed a variety of apparatus which are specifically designed to provide the driver with suitable ready guidance relating to the vehicle's current status of travel with reference to the desired course of travel from time to time during travel, by indicating continuously or discretely a due current position or similar information on the vehicle by way of an indication panel or display screen including a related road map or the like disposed at the driver's seat.

In a typical conventional apparatus for visually indicating a current location of an automotive vehicle for use in such application, a current travel distance of a vehicle is detected by way of distance detecting means in accordance with its current travel speed and time of travel, a current bearing and a current quantity of azimuthal deviation of the vehicle are detected by bearing detecting means, and a current location of the vehicle along its travel route is obtained from arithmetical operation on the basis of the thus-obtained route detection data. The result of such arithmetic operation is stored for visual indication on a display in the form of spot information, which varies from time to time during travel of the vehicle, on a display screen on which there is placed in advance a suitable road map such as printed on a transparent sheet or the like. The driver may thereby comparatively review the thus-indicated visual information and the geographical indication by way of the map sheet so that he may visually confirm the current location of the vehicle along its travel route.

With such a typical construction of the apparatus for use as described hereinabove, however, it is commonly required in order to obtain a due locational guidance with reference to the current location of an automotive vehicle that the driver of a vehicle must take the trouble to select in advance of travel one proper sheet from a plurality of prepared local maps which includes a correct area of travel, so that it may be placed in position on the surface of the display. The driver must also manually adjust such map sheet set upon the display screen because it is likely to randomly shift out of its due position during travel of the vehicle due to vibrations, turning motion, etc., which may be frequently encountered during the vehicle's travel. These operations are awkward and troublesome for the driver or operator.

The present invention effectively overcomes the aforesaid inconveniences and difficulties experienced in selecting from a set of local area maps as printed on transparent sheets so as to be set upon the display screen in the conventional location detecting apparatus for use in an automotive vehicle.

SUMMARY OF THE INVENTION

The present invention provides an improved current location indicating apparatus having an advantageous useful function for use in an automotive vehicle. Instead of the troublesome job of selecting from a bulky set of local area maps and placing a selected one upon the display screen prior to the start of travel, a series of local area maps of a certain extended area are photographed in advance on a microfilm, which is stored in the form of a photographic image collection, so as to be subsequently readable for direct visual indication on display of a desired area map upon which the driver wishes to travel. There is thus provided a suitable visual indication relating to a current travel state such as a current location, and the tracing of a current path of travel of the vehicle in such a manner that a series of area maps may be presented in succession in a scrolling fashion as the travelling vehicle moves out of an area map which is currently shown in the display, thus providing for convenient observation of the shifting adjacent area maps.

According to the present invention, there is provided an improved current location indicating apparatus for use in an automotive vehicle, wherein a current location of the automotive vehicle in terms of two-dimensional coordinates may be obtained arithmetically by means of a signal processing unit on the basis of a signal to detect a current travel distance of the vehicle and a signal to detect a current direction of travel taken by the vehicle, so that the current location of the vehicle may be visually indicated on a display screen on the basis of the obtained locational data which varies from time to time. The apparatus comprises a microfilm including a plurality of fractioned area maps with a part of their areas overlapped with each other, an access unit adapted to access each of the plurality of area maps, and an image pick-up unit adapted to photographically pick-up the images of the area maps accessed.

A desired area map is presented on the display screen in accordance with the graphic information of each of the area maps as read-out by means of the image pick-up unit, and when the current locational point of the vehicle comes near the edge of the area of display of an area map currently on display as the vehicle proceeds in its travel, another related area map with a part overlapped with the previous one is switched to on the display under the control of the signal processing unit.

The above and further details, objects and advantages of the present invention will become apparent from the following detailed description, when read in conjunction with the accompanying drawings.

BRIEF DESCRIPTION OF THE DRAWINGS

FIGS. 5(a) through 5(e) are schematic views showing a typical manner of overlapping in the visual indication on the display screen when a global map of a certain area is divided into several sections.

FIGS. 6(a) through 6(c) are schematic views showing more specifically the manner in which divided blocks overlap with each other.

DETAILED DESCRIPTION OF PREFERRED EMBODIMENTS

Figure 1:
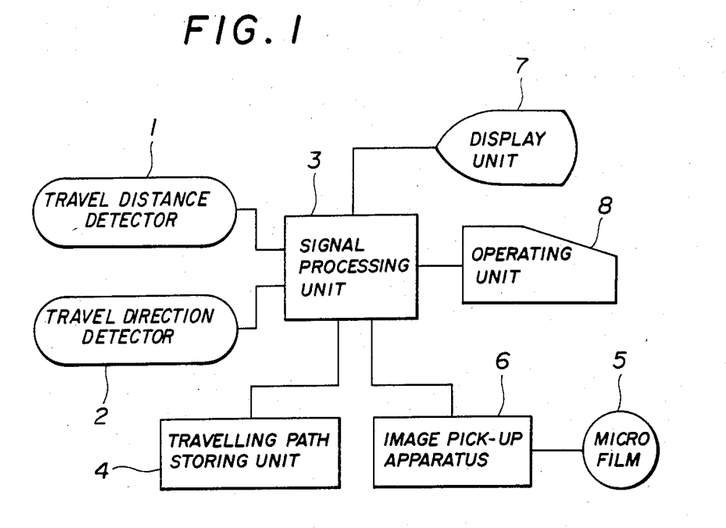
FIG. 1 is a schematic block diagram showing the basic construction of the current location indicating apparatus according to a preferred embodiment of the present invention.

With reference to FIG. 1, there is shown the basic construction of an improved current location indicating apparatus for use in an automative vehicle according to the present invention. The apparatus comprises, in a preferred embodiment thereof, a travel distance detector 1 which is adapted to generate an electric pulse signal corresponding to a current travel distance of a vehicle and is comprised of a sensor of a photoelectric, electromagnetic or mechanical-contact type for producing electric pulses which are proportional to, for example, a current number of revolutions of a vehicle's wheels. A bearing or azimuth detection unit or travel direction detector 2 is adapted to output an electric signal which is proportional to a current bearing or a current amount of azimuthal deviation of the vehicle corresponding to a current travel direction thereof as detected by, for example, a rate-type gyroscope which is adapted to detect an angular velocity in the yawing plane. A signal processing unit 3 is adapted to count the electric pulse signals from the travel detector 1 so as to measure the current travel distance of the vehicle, determine the current travel direction of the vehicle from the output of the travel direction detector 2, and arithmetically operates to obtain current positional data or values in terms of two-dimensional coordinates at an interval of a unit travel distance of the vehicle in accordance with the detection signals from both detection units 1 and 2, while controlling the entire apparatus. A path of travel storing unit or random access memory (RAM) 4 is adapted to sequentially store data on the discrete positional information in terms of the two-dimensional coordinates which vary from time to time during travel of the vehicle and are obtained by the signal processing unit 3, and hold the data as finite and continuous information on the positions corresponding to the current location of the vehicle.

A microfilm 5 has photographically recorded in advance thereon the desired area map, and an image pick-up unit 6 is adapted to electronically read desired information on a concerned area map from the microfilm 5. A display unit 7 is adapted to visually indicate such desired area map in accordance with the thus read-out map information together with the visual marking indication of the current state of travel as updated from time to time following the vehicle's travel, such as on a current location of the vehicle, a current path of travel up to the current location thereof, a current travel direction thereof, etc., in accordance with current cumulated locational data stored in the travelling path storing unit 4.

A manual operating unit 8 is adapted to give a command of indication to the signal processing unit 3, specify the selection of an area map desired to be indicated on the display unit 7, modify an appropriate setting such as of a directional change of the path of travel of the vehicle to be indicated on the display, a shift of the position of such indication, a partially enlarged indication of the road map and the current path of travel, a manual selection of a scale of indication on the display, etc., and also retrieve the area maps and the vehicle's path of travel to be displayed.

The operation of such construction of the vehicle's current location indicating apparatus according to the present invention will now be explained.

In operation, prior to start-up of the vehicle, the driver or operator of the vehicle specifies a map of a specific area by selecting, for example, a due number thereof upon which he wishes to travel, by way of the manual operating unit 8. Upon the selection of a due area map which is desired to be displayed, the signal processing unit 3 operates to read the specified map information from the microfilm 5 so as to deliver the thus-obtained map information to the display unit 7 and visually indicate that particular map of the area that is required for the vehicle's travel to be shown on the display screen. In such operation, the image pick-up unit 6 operates to continuously read the map information on the desired area to be followed by the vehicle, from which the information is constantly ready to be delivered to the display unit 7, whereby any maps as required to be displayed in accordance with the driver's selection can now be ready for indication in succession on the screen of the display unit 7.

With respect to access means to a map of a specific area to be displayed on the screen, any suitable means for selecting a required road map for the specific area to be travelled by the vehicle may be employed, such as by the manual feeding operation of the microfilm 5 under the control of the signal processing unit 3, and also, when so desired, by manual keying operation at the manual operating unit 8, while visually indicating in succession a plurality of area maps as photographically stored on the microfilm 5 to permit selection of any area maps for travel desired to be displayed on the display screen.

As an initialization procedure, it is required that marks such as a mark for indicating a current location of the vehicle and a mark for showing a desired direction of travel or heading of the vehicle at the current starting location thereof are indicated respectively on the display screen of the display unit 7, by way of the manual key-in operation on the operating unit 8. Then, the mark for indicating the current location of the vehicle is to be shifted manually to the starting point upon the surface of the map shown on the screen by the operator's manual keying operation at the manual operating unit 8. At the same time, the direction indicating mark is to be adjusted in rotation so that it may coincide with the actual direction of the vehicle at the starting point on the display. With such manual adjustment, the initialization procedures of both indication marks are completed.

If the travel direction detector 2 is of a magnetism-compass type which can detect the absolute orientation thereof in itself, it will be understood that it is not necessary to conduct the initialization of the bearing indicating mark as described above.

After such initialization procedures are completed, and when the vehicle starts its travel, the current location indicating apparatus of the present invention operates in such a manner that there is delivered a single electric pulse signal at an interval of unit travel distance from the travel distance detector 1 to the signal processing unit 3, where the number of pulses is counted so as to measure a current travel distance of the vehicle, while also sending the output from the travel direction detector 2 to the signal processing unit 3 so as to determine a current travel direction or heading of the vehicle at each moment of the motion of the vehicle. The signal processing unit 3 then operates in the above-described manner to arithmetically obtain from time to time a current location or graphic point (x, y) on the X-Y coordinates in the preselected scale of indication on the display screen of the display unit 7 in accordance with the current travel distance and azimuthal deviation of the vehicle which have been detected in the manner described hereinabove. Concurrently, the result of such arithmetic operation is fed sequentially to the display unit 7 for the visual display thereon, and also to the travelling path storing unit 4 so as to be stored therein. The thus-stored content is ready to be read-out constantly to be fed into the display unit 7, in succession. At the same time, an azimuthal signal at a current location of the vehicle is sequentially sent out from the signal processing unit 3 to the display unit 7.

Figure 2:
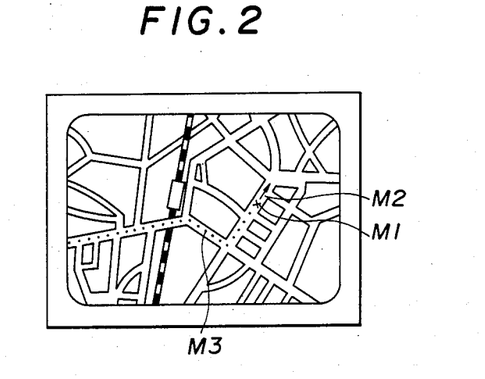
FIG. 2 is a schematic view showing a typical example of a visual indication by way of a local area map shown on the display screen according to a typical embodiment of the invention.

More specifically, as typically shown in FIG. 2, these inputs to the display unit 7 from both the travelling path storing unit 4 and the signal processing unit 3 are adapted to visually indicate by way of a specific road area map desired for travel therealong on the display unit 7 by way of a mark M1 for indicating a current location of the automotive vehicle, a mark M2 for indicating a current travel direction of the vehicle at the current location thereof, and a mark M3 for indicating the current tracing path of travel of the vehicle from the starting point to the current location in a simulated tracing fashion, as the vehicle moves along its travel route. In this connection, the current location mark M1 and the bearing indication mark M2 may be combined in such a manner as to provide the current location of the vehicle with a due directivity thereof by itself, so that a combined indication of the current location and the current bearing indication of the vehicle may be obtained, instead of providing separate marks M1 and M2 as described hereinabove.

Figure 3:
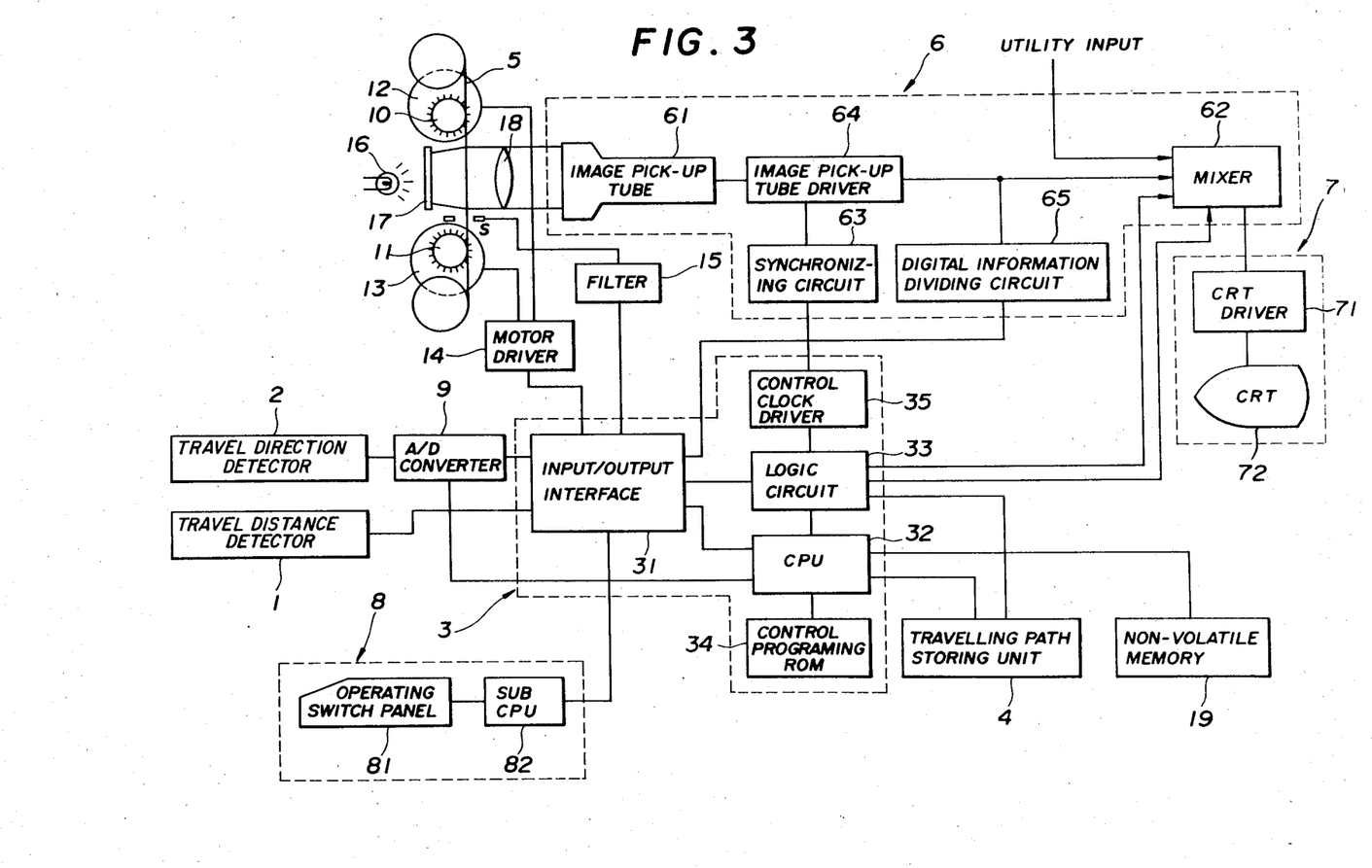
FIG. 3 is a block diagram showing a further detailed practical construction of the current location indicating apparatus of the invention.

With reference to FIG. 3, according to a typical construction of the invention by way of a preferred embodiment thereof, the signal processing unit 3 comprises an input/output interface 31 which is adapted to receive and transmit the electric signals, a CPU 32 which is adapted to control the central arithmetical operation, a logic circuit 33, a control programing ROM 34 and a control clock driver 35. The rate output from the travel direction detector 2 is converted to a digital signal by way of an A/D converter 9 so that it is read by the CPU 32 through the input/output interface 31, where the current azimuthal deviation varying with the travel of the vehicle is detected in sequence. In this construction, the pulse signal output from travel distance detector 1 is transferred to the CPU 32 through the input/output interface 31, in which the number of pulse signals is counted by the counter so that the travel distance of the vehicle may accordingly be detected in due course as the vehicle travels along. The operating unit 8 comprises an operating switch panel 81, and a switch encoding sub-CPU 82 which is adapted to read the inputs from the operating switch panel 81 and provide varied command signals to the CPU 32 through the input/output interface 31.

There is also provided a drive mechanism which can be adapted to drive a microfilm 5 prepared in a cassette configuration and containing the plurality of area maps photographed in advance, and to feed the microfilm 5 either in the forward or reverse direction, and which can be driven under the control of the CPU 32 so as to access any desired area map sheet. More specifically, referring to the construction of the drive mechanism, there are provided sprockets 10, 11 adapted to engage the sprocket perforation in the microfilm 5 so as to drive same either in the forward or reverse direction, and drive motors 12, 13 adapted to respectively drive the sprockets 10, 11. Each of the drive motors 12, 13 is appropriately driven through a motor driver 14, with the locating sensor S detecting the positioning slits provided in correspondence with each of the area maps stored in the microfilm 5. In FIG. 3, reference numeral 15 designates a filter which is adapted to shape the pulse signal of detection from the locating sensor S.

A lamp 16 illuminates from one side of the microfilm 5 at the frame where there is accessed a desired area map, so that the frame including the desired map may be illuminated through a light diffusing panel 17. A light signal including the thus-illuminated information or picture of the desired area map may thus be delivered accordingly through an image formation lens 18 to the image pick-up apparatus 6. With respect to the image pick-up apparatus 6, the light signal is photoelectrically converted by an image pick-up tube 61 (or a one-dimensional or two-dimensional type solid-state image pick-up element) so as to electrically read such area map information, subsequently having the thus-obtained area map information and the data on the current location, heading and path of travel of the vehicle as delivered from the signal processing unit 3 mixed appropriately by means of a mixer 62. In accordance with the thus-obtained video signal through mixing, there is visually indicated the area map together with the indication of the current location, heading and path of travel of the vehicle overlapped on the display screen of a CRT 72 through A CRT driver 71 in the display unit 7. For the procedure of photoelectrical conversion of the visual information on the area maps by way of the light signal into the electric signal by means of the image pick-up tube 61, the electrical reading of the area map information may be conducted in synchronism with the control clock on the part of the signal processing unit 3 by the aid of the image pick-up tube driver 64.

Figure 4:
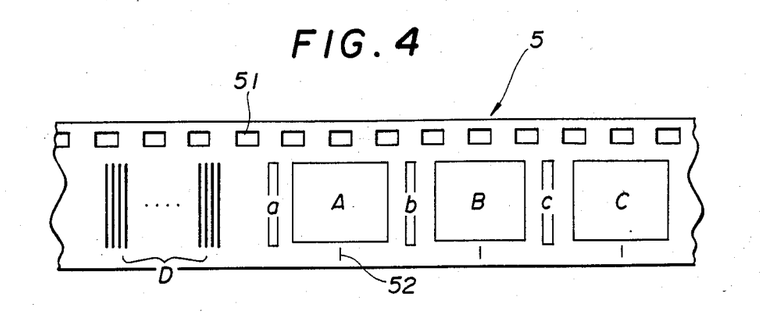
FIG. 4 is a fragmentary view showing a plan a strip of microfilm having several frames in accordance with a preferred embodiment of the invention.

On the other hand, as typcially shown in FIG. 4, recorded on microfilm 5 are a plurality of digitized auxiliary data D (for instance, the number of a cassette of the microfilm) specifically for the purpose of recognizing the existence of the microfilm 5 per se by the signal processing unit 3, so that such data as read at the time of image pick-up may properly be separated by a digital information dividing circuit 65 so as to be transferred to the signal processing unit 3. Furthermore, as typically shown in FIG. 4, also recorded on the microfilm 5 is locating information a, b, c, . . . for each of the area map sections A, B, C, . . . , so that the due recognition of a specific area map along which the vehicle is to travel as indicated on the display unit 7 may readily be made. In this connection, reference numeral 51 in FIG. 4 designates the sprocket holes for the proper feed of the microfilm, and reference numeral 52 designates the slits for detecting the proper location in correspondence with each of the area map sections A, B, C, . . . , respectively.

The current location indicating apparatus of the invention constructed as described hereinabove provides a convenient feature in that any of the area maps which are related in adjacent location with each other may be shifted in a scrolling fashion in the visual presentation on the display screen, as the vehicle proceeds in its travel to move out of an area map which is currently displayed.

Figure 5:
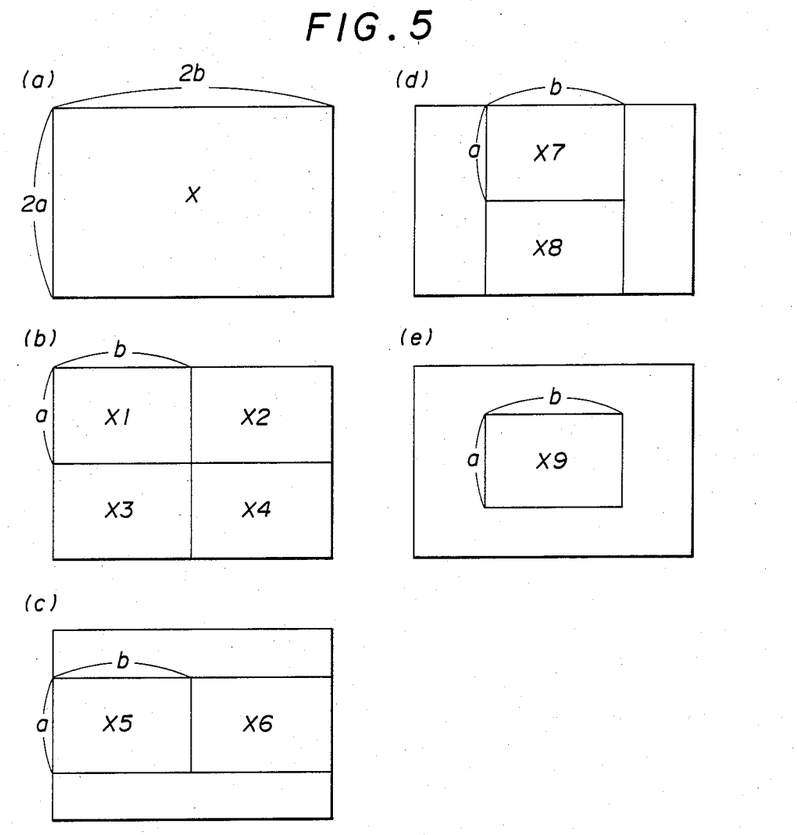
Figure 6:
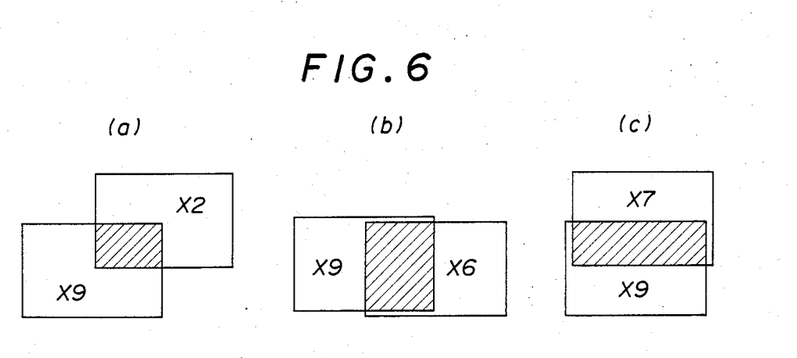

In this connection, as typically shown in FIG. 5(a), if a global map of a specified area X having an area of $2a \times 2b$ is to be photographically recorded on the microfilm 5, it is required to concurrently take individual photographic images or records of nine divided or fractioned area maps x1 through x9 having an equal area of $a \times b$, respectively, as shown in FIGS. 5(b) through 5(e), which are divided from the global area map X with a part being left to be overlapped with each other onto the microfilm 5. More specifically, referring to the manner of such division of the global map X into the related fractional area maps, taking a central area map x9 which exists in the center of the global max X, the picture of a fractional area map x2 existing in the upper right is to be recorded in such a manner, for instance, that there is left one-fourth of its area overlapped with respect to the central area x9 as shown in FIG. 6(a). Another fractional area map x6 in the right is recorded with one-half of its area overlapped with the central area x9 as shown in FIG. 6(b). Another fractional area map x7 in the upper position is recorded with one-half of its area overlapped with the central area x9, and so on. While not shown, a like manner of overlapping is provided for each of the fractioned area maps x1, x3, x4, x5 and x8 existing in the upper left, the lower left and the lower right positions with respect to the central area x9, respectively. Also, each of the fractional area maps x1 through x9 having the equal area of $a \times b$ is set in due correspondence to the size of a map to be displayed on the screen of the display unit 7.

Figure 7:
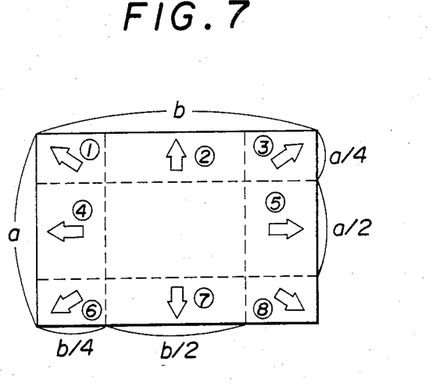
FIG. 7 is a view showing an example of divided areas of judgment for the shifting of area maps related to each other on the display.
Figure 8:
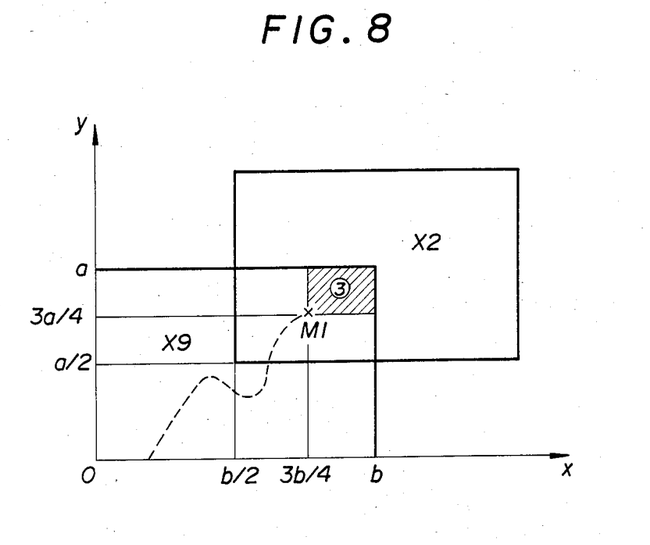
FIG. 8 is a graphic representation showing by way of an example the manner of shifting of related area maps in terms of two-dimensional coordinates.

As described hereinabove, the global area map X is photographically recorded in a fractioned manner such that each of the fractioned area maps x1 through x9 is preliminarily recorded photographically on the microfilm 5 in a predetermined sequence for subsequent access for the presentation on the display. The central area map x9, which corresponds to the specific area to be travelled by the vehicle, is now ready for display having a related fractioned area map or maps displayed in the overlapping relationship, until the vehicle moves out of the central area map x9 as it proceeds in its travel. More specifically, when the vehicle proceeds from the central area map x9 over to an area ③ which is adjacent thereto in the upper right corner as shown in FIG. 7, the signal processing unit 3 operates to detect such a situation so that an automatic shift in the display occurs from the area map x9 to the fractioned area map x2 in a scrolling fashion under the control of the signal processing unit 3, as shown in FIG. 8. Likewise, when the current location of the vehicle moves from the central area x9 over to the fractioned area ① in the upper left corner, there occurs an automatic shifting in the display to the area map x1; when the vehicle moves out to the upper area ②, the presentation is now shifted over to the fractioned area map x7; and when the vehicle comes into the left area ④, it is then shifted over to the area map x5, accordingly. Similar shifting operation will follow as the vehicle moves into the areas ⑤, ⑥, ⑦ and ⑧. The arrows indicate the direction of shifting from one area map to another, respectively.

As shown in FIG. 8, when the shifting in display occurs from the central area map x9 to the area map x2, for instance, the location of a mark M1 indicating the current location of the vehicle in terms of the central area map x9 is now changed upon the area map x2. The signal processing unit 3 operates to cope with this situation by duly converting the positional relationship in the coordinates in such a manner that there is presented the identical position of indication upon the area map x2 with the original position in the central area map x9 after the shifting of presentation on the display. More specifically, in the case of scrolling shift of the visual presentation on the display in terms of the two-dimensional coordinates as typically shown in FIG. 8, there occurs a due conversion in the coordinates from the point b/2, a/2 on the central area map x9 to the point 0, 0 on the adjacent fractioned area map x2. Consequently, there is now a conversion of the current location indicating mark M1 existing at the point $3b/4$, $3a/4$ on the central area map x9 over to a new point b/4, a/4 on the area map x2, thus presenting a smooth and continuous shifting of the current location of the vehicle in the visual presentation on the display.

By virtue of the unique construction of the vehicle's current location indicating apparatus of the present invention, the signal processing unit 3 advantageously operates to determine to shift an area map in fraction currently on the display when the current location of the vehicle comes near an edge portion of the display area as it moves along its path of travel on the display. The current display presentation is thus automatically switched from that area map over to another map which is located adjacently in the direction of the vehicle's travel motion with a due overlapping relationship as described above, so that there can be presented a continued indication of the current location of the vehicle with an unobstructed view ahead on the display. Because switching of the adjacent area maps is effected when the vehicle's current location is within the overlapped area between the area maps, the previous path of travel of the vehicle may advantageously be partly left shown in the newly shifted area map on the display so that a correspondence in the presentation of the previous and new area maps may duly be attained.

Figure 9:
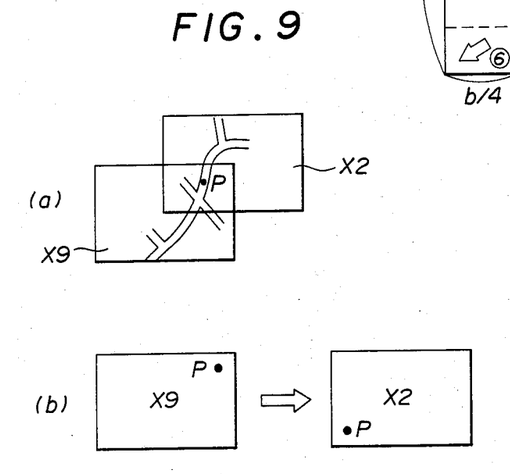
FIG. 9(a) is a schematic view showing an example of the marking of a guide point which is set in the overlapped area of adjacent divided maps to be shifted.
FIG. 9(b) is a schematic view showing an example of the manner in which a guide point is changed in location when one area map is shifted to another on the display.
Figure 10:
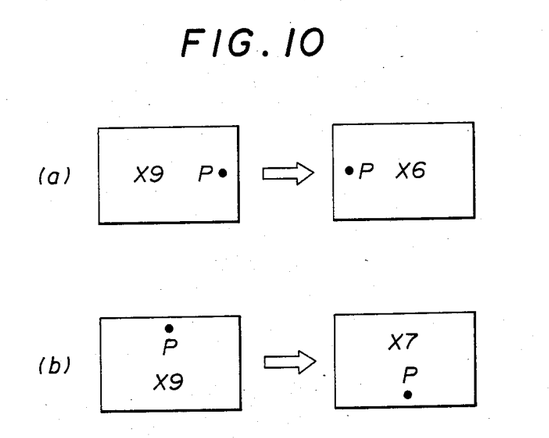
FIGS. 10(a) and 10(b) are schematic views showing other examples of shifting in which a guide point is changed in location when one area map is shifted to another on the display.

With the related area maps switched with each other on the display in the manner as described hereinabove, it is very possible that there will be a substantial change in the position of indication of the path of travel of the vehicle to be presented on the overlapped area, which is likely to result in loss of the trail of the scheduled path of travel on the new area map switched on the display. In this consideration, according to a unique feature of the present invention, there may be indicated a marking of a guide point P at an arbitrary point on the scheduled path of travel to be followed by the vehicle within the overlapped area of the fractioned area maps x2 and x9, for instance, as shown in FIG. 9(a), from operation at the operating unit 8. With this arrangement, when shifting from the area map x9 to the upper right area map x2 on the display, as shown in FIG. 9(b), there is presented the marking of the guide point P upon the same path of travel in the switched area map x2 from the previous area map x9, thereby tracing the relationship of correspondence in the locating of the two maps. The operator may thus readily acknowledge in which way a new area map has been switched on the display. As further examples, FIG. 10(a) shows a case in which the central area map x9 is switched to the related fractioned area map x6 in the right direction, and FIG. 10(b) shows a case in which the central area map x9 is switched to the related area map x7 in the upward direction.

Figure 11:
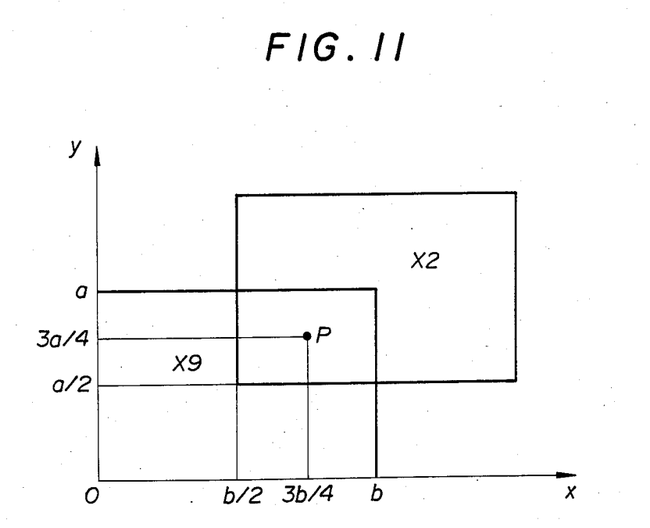
FIG. 11 is a view showing an example of shifting related area maps in terms of two-dimensional coordinates.

As shown in the graphic representation of FIG. 11, when there occurs a shifting in the display from the central area map x9 over to the fractioned area may x2, for instance, there is a change in the location of presenting the guide point P between the previous area map x9 and the new area map x2. For coping with this situation, it is advantageously arranged according to the present invention that the signal processing unit 3 is, as in the case described hereinabove, adapted to make an appropriate arithmetic operation to convert the locational relationship in terms of the two-dimensional coordinates, so that the current locational point on the previous area map x9 and that on the new area map x2 may remain in the same position on the display after shifting.

According to the advantageous construction of the current location indicating apparatus of the present invention wherein the current locational point of the vehicle is continually obtained in terms of two-dimensional coordinates on the basis of the signals relating to the current travel distance and direction of heading of the vehicle by the signal processing unit, the data relating to such locational point changing from time to time as the vehicle moves in travel so that the current location of the vehicle may be displayed on the display screen, there is provided the unique construction which comprises the microfilm including a plurality of fractioned area maps in partly-overlapped relationship, the access means for each of such area maps in the microfilm, and means for photographically picking-up such area maps to be accessed. Each of the area maps may be selectively displayed on the display screen in accordance with the graphic information of such area maps as read by the image pick-up means, and when the current locational point of the vehicle comes near the edge of an area of display of an area map as it proceeds in its travel, another related area map is switched to with a part overlapped with the previous one on the display under the control of the signal processing unit. There is thus attained various advantages such as that the shifting in the visual indication of the related area map may be conducted in the way that the vehicle is progressing in a partly-scrolling fashion, so as to assure a favorable and unobstructed view in the current locational presentation of the vehicle on the display.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A current location indicating apparatus for use in an automotive vehicle wherein a current location of said automotive vehicle in terms of two-dimensional coordinates is obtained arithmetically by signal processing means on the basis of a signal to detect a current travel distance of said vehicle and a signal to detect a current direction of travel taken by said vehicle so that the current location of said vehicle may be visually indicated on a display screen on the basis of the thus-obtained locational data which varies from time to time, which comprises:

microfilm means including a plurality of fractioned area maps with a part of the areas thereof overlapped with each other;

access means for accessing each of said plurality of area maps;

means for photographically picking-up images of said area maps as read-out by said image pick-up means; and wherein a desired area map is presented on said display screen in accordance with the graphic information of each of said area maps as read-out by said image pick-up means, and wherein when the current locational point of said vehicle comes near the edge of the area of display of an area map currently on the display as the vehicle proceeds in its travel, another related area map with a part overlapped with the previous one is switched to on the display under the control of said signal processing means.

2. A current location indicating apparatus according to claim 1, further comprising:

means for presenting a marking of a guide point within the area of overlap of two adjacent related area maps that are selectively accessed so as to be switched sequentially for indication on said display screen under the control of said signal processing means.

* * * * *